United States Patent
Michael

(10) Patent No.: US 9,121,751 B2
(45) Date of Patent: Sep. 1, 2015

(54) WEIGHING PLATFORM WITH COMPUTER-VISION TRACKING

(75) Inventor: David J. Michael, Wayland, MA (US)

(73) Assignee: Cognex Corporation, Natick, MA (US)

(*) Notice: Subject to any disclaimer, the term of this patent is extended or adjusted under 35 U.S.C. 154(b) by 209 days.

(21) Appl. No.: 13/296,950

(22) Filed: Nov. 15, 2011

(65) Prior Publication Data

US 2013/0118814 A1  May 16, 2013

(51) Int. Cl.
 *G01G 23/38* (2006.01)
 *G01G 19/03* (2006.01)
 *G01G 19/393* (2006.01)
 *G01G 19/387* (2006.01)

(52) U.S. Cl.
 CPC .............. *G01G 23/38* (2013.01); *G01G 19/035* (2013.01); *G01G 19/393* (2013.01); *G01G 19/387* (2013.01)

(58) Field of Classification Search
 CPC . G01G 19/035; G01G 19/387; G01G 19/393; G01G 23/38
 USPC ............ 177/1–5, 25.11, 25.13, 25.19, 52–57; 702/173–175
 See application file for complete search history.

(56) References Cited

U.S. PATENT DOCUMENTS

| | | | | |
|---|---|---|---|---|
| 6,961,456 | B2 * | 11/2005 | Bonner et al. | 382/143 |
| 7,216,013 | B2 * | 5/2007 | Kibbler | 700/229 |
| 7,279,644 | B1 * | 10/2007 | Kasel | 177/25.13 |
| 7,377,429 | B2 * | 5/2008 | Anderson et al. | 235/385 |
| 7,586,049 | B2 | 9/2009 | Wurz | |
| 8,301,296 | B2 * | 10/2012 | Grundmann et al. | 700/224 |
| 2008/0164074 | A1 * | 7/2008 | Wurz | 177/1 |
| 2009/0095047 | A1 * | 4/2009 | Patel et al. | 73/1.01 |
| 2012/0212603 | A1 * | 8/2012 | Lindee et al. | 348/89 |
| 2012/0271592 | A1 * | 10/2012 | Harres et al. | 702/173 |
| 2013/0092456 | A1 * | 4/2013 | Laird et al. | 177/1 |

OTHER PUBLICATIONS

Lepetit, Vincent et al., "Monocular Model-Based 3D Tracking of Rigid Objects", Foundations and Trends in Computer Graphics and Vision 1:1 now Publishers Inc. (2005).

* cited by examiner

*Primary Examiner* — Peter Macchiarolo
*Assistant Examiner* — Natalie Huls
(74) *Attorney, Agent, or Firm* — Loginov & Associates PLLC

(57) ABSTRACT

The disclosure relates to weighing moving objects in a weighing platform functionally coupled to a computer-vision tracking platform. The objects can translate, rotate, and translate and rotate. Weighing of the objects can be accomplished through combination of object imaging and upstream weighing. Object imaging can permit tracking, through computer vision, a logical object moving in a trajectory from the first location to the second location, wherein a logical object is a formal representation of one or more physical objects. Upstream weighing can permit updating a record indicative of weight of the one or more physical objects associated with the tracked logical object. As a part of weighing termination, data integrity check(s) can be performed on a plurality of records indicative of a weight of a single physical object. Based on outcome of the data integrity check(s), a record indicative of the weight of the single physical object can be supplied.

23 Claims, 6 Drawing Sheets

WEIGHING PLATFORM WITH COMPUTER-VISION TRACKING

SUMMARY

One or more embodiments of the disclosure provide weighing of objects moving in a weighing platform functionally coupled to a computer-vision tracking platform. The objects can be rigid or semi-rigid and can translate, rotate, or translate and rotate. In addition, or in the alternative, the objects can change their tilt angle. The latter being likely in scenarios in which an object lies on another object. As a result, an object can occlude or be occluded by another object. Weighing of the objects can be accomplished through combination of object imaging and upstream weighing. Object imaging can permit tracking, through computer vision, a logical object moving in a trajectory from the first location to the second location, wherein a logical object is a formal representation of one or more physical objects. Upstream weighing can permit updating a record indicative of weight of the one or more physical objects associated with the tracked logical object. As a part of weighing termination, data integrity check(s) can be performed on a plurality of records indicative of a weight of a single physical object. Based on outcome of the data integrity check(s), a record indicative of the weight of the single physical object can be supplied.

Various embodiments of the disclosure can provide one or more advantage when compared to conventional weighing technologies. One exemplary advantage can include increased reliability of data indicative of the weight of an object. Another exemplary advantage can include shortened acquisition times for data indicative of weight of an object. Shortening of such acquisition times (or lowered weighing latency) is afforded primarily by the computer-vision tracking platform which can permit reduction or avoidance of human intervention in the weighing of the object.

Additional aspects, features, or advantages of the subject disclosure will be set forth in part in the description which follows, and in part will be obvious from the description, or may be learned by practice of the subject disclosure. The advantages of the subject disclosure will be realized and attained by means of the elements and combinations particularly pointed out in the appended claims. It is to be understood that both the foregoing general description and the following detailed description are exemplary and explanatory only and are not restrictive of the subject disclosure.

BRIEF DESCRIPTION OF THE DRAWINGS

The accompanying drawings are incorporated and illustrate exemplary embodiment(s) of the subject disclosure and together with the description and claims appended hereto serve to explain various principles, features, or aspects of the subject disclosure.

DETAILED DESCRIPTION

Figure 1:
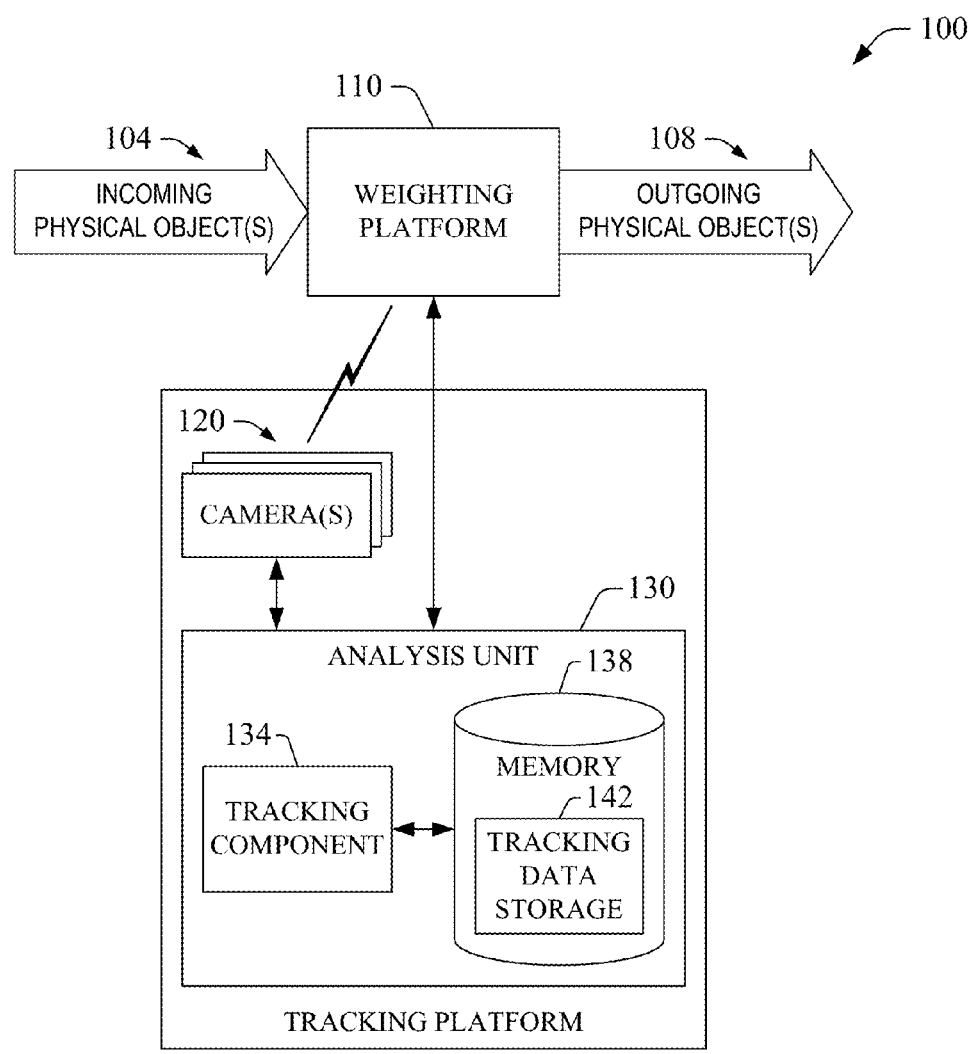
FIG. 1 illustrates an exemplary system for weighing objects moving from a first location to a second location in accordance with one or more aspects of the disclosure.

The subject disclosure may be understood more readily by reference to the following detailed description of exemplary embodiments of the subject disclosure and to the Figures and their previous and following description.

Before the present compounds, compositions, articles, systems, devices, and/or methods are disclosed and described, it is to be understood that the subject disclosure is not limited to specific systems and methods for weighing objects through, at least in part, computer-vision tracking It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In the subject specification and in the claims which follow, reference may be made to a number of terms which shall be defined to have the following meanings: "Optional" or "optionally" means that the subsequently described event or circumstance may or may not occur, and that the description includes instances where said event or circumstance occurs and instances where it does not.

As employed in this specification and annexed drawings, the terms "unit," "component," "interface," "system," "platform," and the like are intended to include a computer-related entity or an entity related to an operational apparatus with one or more specific functionalities, wherein the computer-related entity or the entity related to the operational apparatus can be either hardware, a combination of hardware and software, software, or software in execution. One or more of such entities are also referred to as "functional elements." As an example, a unit may be, but is not limited to being, a process running on a processor, a processor, an object, an executable computer program, a thread of execution, a program, a memory (e.g., a hard disc drive), and/or a computer. As another example, a unit can be an apparatus with specific functionality provided by mechanical parts operated by electric or electronic circuitry which is operated by a software or a firmware application executed by a processor, wherein the processor can be internal or external to the apparatus and executes at least a part of the software or firmware application. In addition or in the alternative, a unit can provide specific functionality based on physical structure or specific arrangement of hardware elements. As yet another example, a unit can be an apparatus that provides specific functionality through electronic functional elements without mechanical parts, the electronic functional elements can include a processor therein to execute software or firmware that provides at least in part the functionality of the electronic functional elements. An illustration of such apparatus can be control circuitry, such as a programmable logic controller. The foregoing example and related illustrations are but a few examples and are not intended to be limiting. Moreover, while such illustrations are presented for a unit, the foregoing examples also apply to a component, a system, a platform, and the like. It is noted that in certain embodiments, or in connection with certain aspects or features thereof, the terms "unit," "component," "system," "interface," "platform" can be utilized interchangeably.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Reference will now be made in detail to the various embodiment(s), aspects, and features of the disclosure, example(s) of which are illustrated in the accompanying drawings. Wherever possible, the same reference numbers are used throughout the drawings to refer to the same or like parts.

As described in greater detail below, the disclosure relates to weighing objects moving from a first location to a second location. The first location and the second location can be part of a region spanning from an initial weighing area to a final weighing area. Each of the objects can translate, rotate, or translate and rotate as part of its movement among such locations. Occlusion of an object by another also is contemplated. Weighing of the objects can be accomplished through combination of imaging of such objects and upstream weighing. Imaging can permit tracking, through artificial vision, a logical object moving in a trajectory from the first location to the second location, wherein a logical object is a formal representation of one or more physical objects. One or more upstream scales deployed between such locations can permit updating a record indicative of weight of the one or more physical objects associated with the logical object as such object is tracked. In response to a weighing termination criterion, one or more data integrity checks can be performed on one or more data records indicative of a weight of a logical object associated with a single physical object. Performance of such data integrity checks provides increased reliability to the weighing of an object with respect to conventional weighing technologies. Based on outcome of the data integrity checks, a record indicative of the weight of the single physical object can be supplied.

Figure 2:
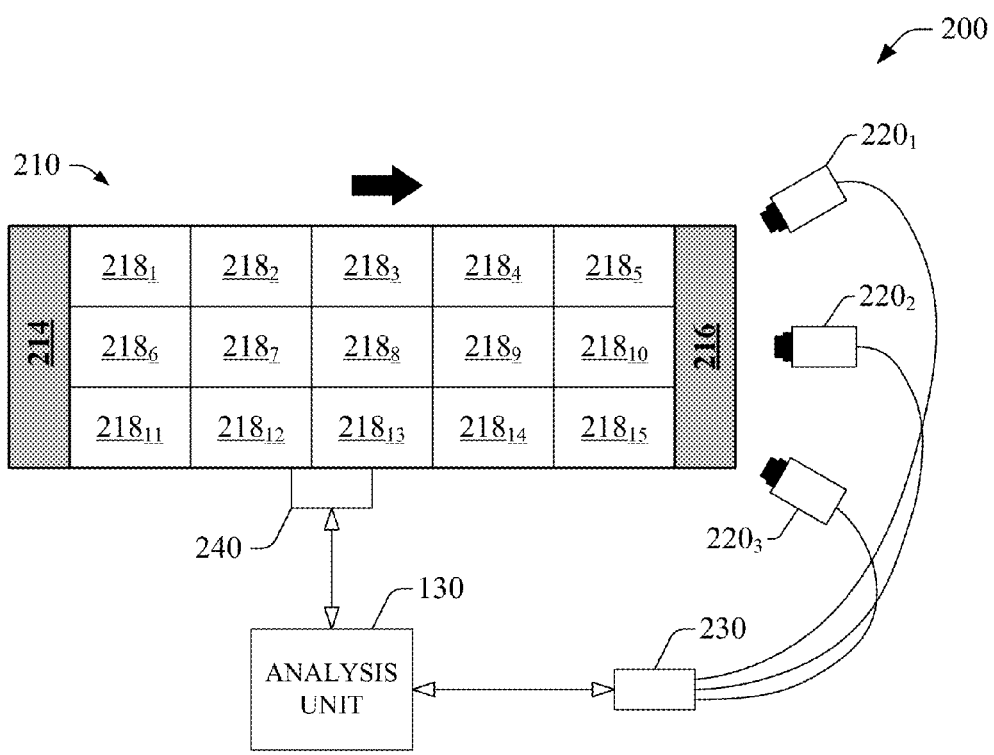
FIG. 2 illustrates an exemplary embodiment of the exemplary system presented in FIG. 1.

Referring to the drawings, FIG. 1 illustrates a high-level block diagram of an exemplary system 100 for weighing one or more moving objects in accordance with aspects of the disclosure. Various features of exemplary system 100 are illustrated with an exemplary embodiment 200 presented in FIG. 2. Exemplary system 100 comprises a weighing platform 110 into which a group of one or more incoming physical object(s) 104 can be loaded and weighted. The weighing platform 110 can comprise a plurality of scales that can weight a physical object of such group. The weighing platform 110 can comprise a movable platform (e.g., platform 210) that can transport at least a portion of such group. The plurality of scales (e.g., scales $218_1$-$218_{15}$) can be functionally coupled to the movable platform or the analysis unit 130, or to both. In one exemplary implementation of such coupling, the plurality of scales (e.g., scales $218_1$-$218_{15}$) can be collocated with the movable platform and operationally connected to the analysis unit 130. In certain embodiments, the movable platform can be a conveyor belt. In other embodiments, a movable platform can be configured in a static position suitable to permit movement of at least a portion of the group of the one or more incoming physical object(s) 104. For instance, in such embodiments the movable platform can be configured in an inclined position with respect to the direction of gravity, which can permit movement of at least the portion of the group of the one or more incoming physical object(s) 104. In such configuration, in addition or in the alternative, the portion of the group of the one or more incoming physical object(s) 104 can be pulled or pushed. In one aspect, at least the portion of the group of one or more incoming physical object(s) 104 embodies the one or more moving objects referred to above; and a group of one or more physical object(s) 108 which can comprise at least the portion of the group of the one or more incoming physical object(s) 104 can be unloaded from the weighing platform 110. Loading can occur at an initial weighing area (e.g., region 214) and unloading can take place at a final weighing area (e.g., region 216). The initial weighing area and the final weighing area can be part of the weighing platform 110, and both can have respective scales.

In the weighing platform 110, the portion of the group of one or more incoming physical object(s) 104 can form a non-empty set of physical objects (e.g., a plurality of objects). In one embodiment, the plurality of scales (e.g., scales $218_1$-$218_{15}$) which are commensurate with object size and can weigh one or more physical object(s) of the non-empty set of physical objects. At least one scale of the plurality of scales can be functionality coupled (e.g., communicatively coupled) to analysis unit 130, and can supply weighing data indicative of a weight of the one or more physical object(s) thereto. To at least such end, in certain embodiments (e.g., exemplary embodiment 200) one or more connector(s) 240 can functionally couple the plurality of scales with the analysis unit 130. In certain implementations, the analysis unit 130 can be embodied in a computing device (see, e.g., computing device 301 in FIG. 3).

The weighing platform 110 also can include one or more camera(s) 120 that can image the non-empty set of physical objects (e.g., a plurality of objects). In one embodiment, such as exemplary embodiment 200, the one or more camera(s) 120 can comprise three cameras $220_1$ through $220_3$. Optical coupling between the one or more camera(s) 120 is pictorially represented by a spark-shaped link. Each camera of the one or more camera(s) 120 can acquire at least one image of the non-empty set of physical objects at one or more locations within a trajectory from a first location and a second location that are part of trajectory from the initial weighing area to the final weighing area. As a result, each camera of the one or more camera(s) 120 can yield imaging data indicative of the at least one image.

In exemplary system 100, the one or more camera(s) 120 are functionally coupled to the analysis unit 130, forming a tracking platform that can exploit computer vision to track objects in the weighing platform. Each of the one or more camera(s) 120 can output at least a portion of the imaging data to an analysis unit 130. To at least such end, each of the one or more camera(s) 120 can include optics element(s) for photon collection (such as lens(es) and apertures) and electronic circuitry, such as photosensitive functional element(s) (e.g., a photodiode), amplifier(s), analog-to-digital converter(s), and so forth. The one or more camera(s) can be functionally coupled to the analysis unit 130 through an interface (e.g., connector(s) 230) which can permit transmission of imaging data to such unit.

Imaging the non-empty set of physical objects can enable the exemplary system 100 to exploit computer vision to track at least one object (e.g., one, two, more than two and less than all, or all) of the non-empty set of physical objects. Computerized vision tracking techniques can be selected from those described in V. Lepetit and P. Fua, "Monocular Model-Based 3D Tracking of Rigid Objects: A Survey," Foundations and Trends in Computer Graphics and Vision 1, 1-89 (2005). Combination of such techniques can be implemented. Selection of a computerized vision tracking technique from those described in such manuscript authored by Lepetit and Fua can depend, at least in part, on suitability for tracking object in an industrial environment, which may have specific lighting conditions and may include object with strong contours and well-defined silhouettes. The computerized vision tracking techniques disclosed in the foregoing manuscript of Lepetit and Fua include fiducial-based tracking techniques; recursive tracking which can comprise model-based tracking techniques (e.g., contour based methods, edge based methods, optical flow-based methods, template matching, or interest point-based methods); and methods non-reliant on a priori three-dimensional models. The computerized tracking techniques described in the work of Lepetit and Fua referred to above also include tracking by detection methods, which can comprise feature point extraction and wide baseline matching. Some of the foregoing computerized techniques can include a machine learning stage in which features or markers of one or more scenes, or reference points of an object in various scenes are learned prior to implementing the tracking at runtime.

In one aspect, to exploit computer vision to track at least one object, the analysis unit 130 can process imaging data to represent the non-empty set of physical objects (e.g., a plurality of objects) as a non-empty set of logical objects. The analysis unit 130 can identify the non-empty set of logical objects through implementation (e.g., execution) of one or more computer vision formalisms, such as image segmentation; as illustrated, the analysis unit 130 can comprise tracking component 134 that can perform the identification. Such representation can be time dependent in that processing of first imaging data available at a first instant can yield a first non-empty set of logical objects, and processing of second imaging data available at a second instant can yield a second non-empty set of logical objects. As an illustration, in a scenario in which the first instant (e.g., $\tau_{prior}$) is prior to the second instant (e.g., $\tau_{current}$), the first non-empty set can be referred to as a prior non-empty set of logical objects and the second non-empty set can be referred to as a current non-empty set of logical objects. The representation of the non-empty set of physical objects can be time-dependent because a logical object is a formal representation of, and thus corresponds to, one or more physical objects. For example, at certain instant, a logical object can result from two occluding objects, whereas at another instant, the logical object can cease to be defined and two logical objects can be created to represent, respectively, each of the two occluding objects.

By collecting imaging data associated with a series of images of the non-empty set of physical objects as each object in such non-empty set moves through the weighing platform from a first location to a second location, the analysis unit 130 can identify a series of non-empty sets of logical objects associated with such series of images and, thereby, track motion of each logical object. For each logical object that is tracked, the analysis unit 130 can update (e.g., allocate and retain in a memory, such as memory 138) motion information. In one embodiment, the motion information can comprise a data record indicative of one or more of (1) tracking information (appearance model, direction of motion, velocity, grey-level histogram, color histogram, color, barcode information, etc.); (b) trajectory information (e.g., position within the weighing platform 110); or (c) weight information (e.g., a record indicative of weight of an object (physical or logical)). Each image in the series of images can correspond to an instant during motion of the non-empty set of physical objects from the first location to the second location. Accordingly, for a non-empty set of instants $\{t_0, t_1, t_2, \ldots t_N\}$ (with N being a natural number) the one or more camera(s) 120 can acquire a non-empty set of images $\{I_1, I_2, \ldots I_N\}$ and supply the associated imaging data to analysis unit 130 which can identify a series of non-empty sets $\{S_1, S_2, \ldots S_N\}$ of logical objects.

To track a logical object, analysis unit 130 can compare a first image (e.g., a current image $I_J$, with $1 \leq J \leq N$) acquired at a first time (e.g., $t_J$) with a second image (e.g., a prior image $I_K$, with $1 \leq K \leq N$ and $K<J$) acquired at a second time (e.g., $t_K$), wherein the first time and the second time are contiguous in the non-empty set $\{t_0, t_1, t_2, \ldots t_N\}$. Such comparison can comprise various outcomes, wherein each outcome can permit analysis unit 130 to update at least one record representative of one or more of tracking information or trajectory information for a logical object of the current non-empty set of logical objects associate with the first image (e.g., the current image). A first outcome of the comparison of the first image with the second image can be indicative of a new logical object being present in current non-empty set $S_J$ associated with the current image $I_J$. In response to such outcome, analysis unit 130 can update (e.g., allocate and retain in memory) a data record indicative of a current location of the new logical object in a trajectory from the initial weighing area to the final weighing area of weighing platform 110. In addition or in the alternative, analysis unit 130 can update (e.g., allocate and retain in memory, such as memory 138) a data record indicative of an identifying feature, or tracking feature, such as appearance model, direction of motion, velocity, grey-level histogram, color histogram, color, barcode information, and the like, of the new logical object.

There are at least two scenarios that can yield a new logical object in a current non-empty set of logical objects. First, a new physical object can be uploaded into the weighing platform 110 and can become a part of the non-empty set of physical objects that is transported in such platform and imaged by the one or more camera(s) 120. Second, the new logical object can be a previously fully occluded or partially occluded object in a previous non-empty set of logical objects, such as $S_K$. In such second scenario, the new logical object can be categorized as (A) an unobstructed new item which is identified for the first time in the current non-empty set of logical objects; or (B) an unobstructed extant item which is a previously identified (or visible) logical object that is occluded for a predetermined period prior to the instant (e.g., $t_J$) at which the first image is acquired and is re-identified in the current non-empty set of logical objects. With respect to weighing information, analysis unit 130 can receive weighing data indicative of a weight of the new logical object and update (e.g., augment, delete) a data structure indicative of the weighing information. In case the new logical object is categorized as an unobstructed new item, such update can comprise deleting data record(s) indicative of weight of a previously identified logical object that is not identified in the current non-empty set. In addition or in the alternative, the update can comprise generating a data structure (e.g., a list) to retain a data record indicative of a weight of the new logical object. In case the new logical object is categorized as an unobstructed extant item, the update can comprise augmenting an extant data structure (e.g., a list) with a current data record indicative of a weight of the new logical object, wherein the extant data structure contains at least one data record indicative of a weight of the unobstructed extant item.

A second outcome of the comparison of the first image with the second image can be indicative of the logical object being extant in the current non-empty set $S_J$ associated with the current image $I_J$ from prior non-empty set $S_K$ associated with the previous image $I_K$. Such object can be referred to as a regular item. In response to such outcome, analysis unit 130 can update (e.g., allocate and retain in memory) a data record indicative of a current location of the logical object in a trajectory from the initial weighing area to the final weighing area. The current location can be retained in a data structure (e.g., a list) indicative of trajectory information. With respect to weighing information, analysis unit 130 can receive, from a scale, for example, weighing data indicative of a weight of the logical object and update (e.g., augment) a data structure indicative of the weighing information.

When a physical object of the non-empty set of physical objects are at a second location within the final weighing area, a logical object that represents, or corresponds to, the physical object has a trajectory location record indicative of the logical object being at the second location. The logical object has been tracked as described herein from a location within the weighing platform to the final weighing area. In such scenario, analysis unit 130 can implement one or more data integrity checks related to a plurality of records indicative of a weight of the logical object that represents the physical object. One exemplary data integrity check of the one or more data integrity checks can include a determination of a number of non-null records in the plurality of records indicative of the weight of the physical object. A satisfactory outcome for such data integrity check can be the number being equal to or greater than unity. Another exemplary data integrity check can include determination of fluctuations of the plurality of records indicative of the weight of the physical object. A satisfactory outcome for such data integrity check can be the fluctuations having magnitudes within a predetermined tolerance. Yet another exemplary data integrity check can include a determination of fluctuations of a plurality of records indicative of at least one identifying feature, such as trajectory or appearance model, of the physical object. Each record of the plurality of records can correspond to a location in the trajectory from the initial weighing area to the final weighing area. A satisfactory outcome for such data integrity check can be such fluctuations having magnitudes within another predetermined tolerance. In response to a satisfactory outcome (e.g., value of a check metric is within a predetermined threshold) for each of the one or more data integrity checks, analysis unit 130 can supply the weight of the single physical object. In the alternative, in response to an unsatisfactory outcome (e.g., value of a check metric is not within a predetermined threshold) for at least one of the of the one or more data integrity checks, analysis unit 130 can probe a weight of the physical object at the final weighing area, wherein a final scale can be deployed, and can supply a data record indicative of the weight of the physical object. In an aspect, to probe such weight, the analysis unit 130 can query the final scale for the weight of the physical object.

Figure 3:
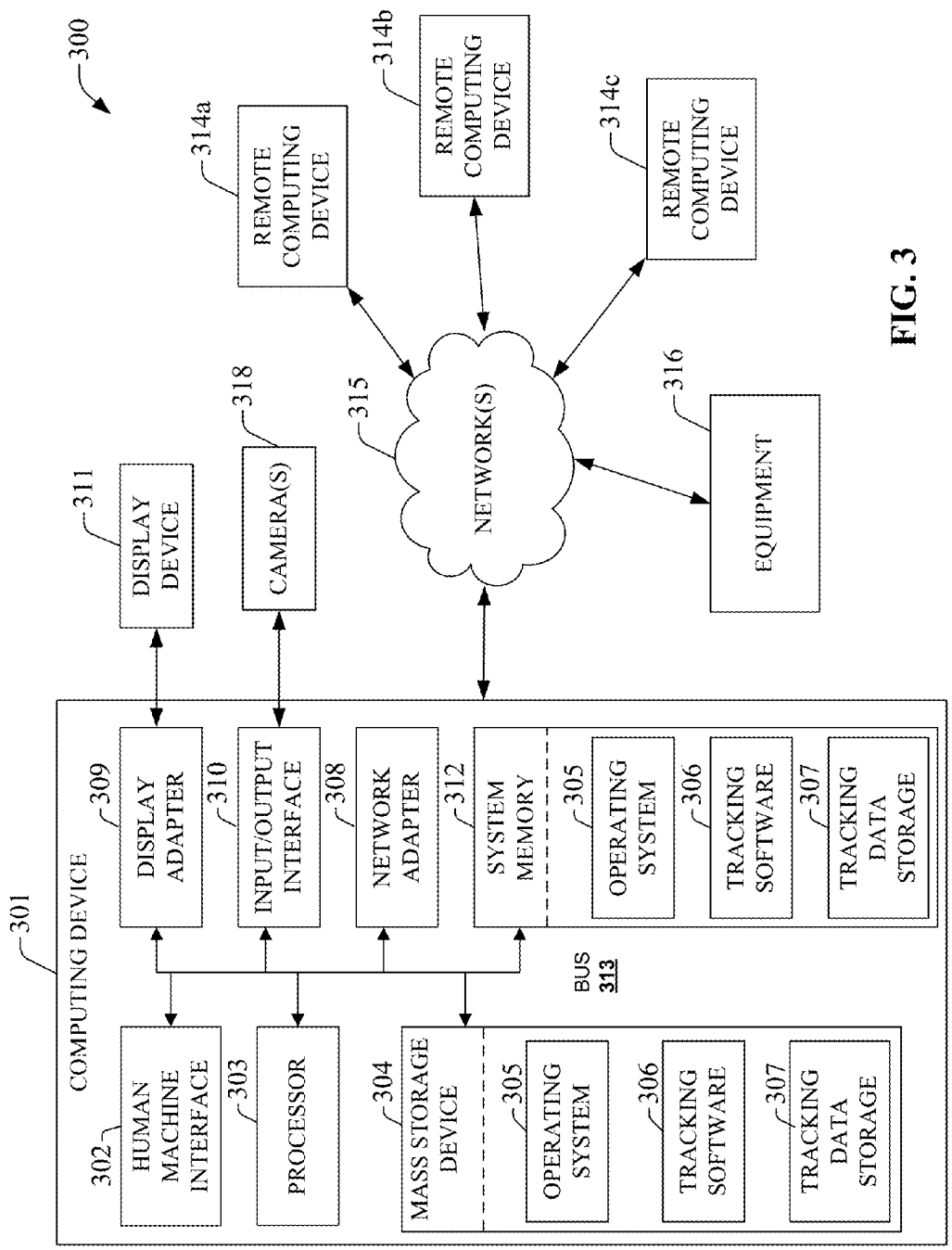
FIG. 3 illustrates an exemplary embodiment of a computing environment that can enable various aspects of weighing moving objects as described in the disclosure.

FIG. 3 illustrates a block diagram of an exemplary operating environment 300 having a computing device 301 that enables various features of the disclosure and performance of the various methods disclosed herein. Computing device 301 can embody analysis unit 130. This exemplary operating environment 300 is only an example of an operating environment and is not intended to suggest any limitation as to the scope of use or functionality of operating environment architecture. Neither should the exemplary operating environment 300 be interpreted as having any dependency or requirement relating to any one or combination of functional elements (e.g., units, components, adapters, or the like) illustrated in such exemplary operating environment.

The various embodiments of the disclosure can be operational with numerous other general purpose or special purpose computing system environments or configurations. Examples of well known computing systems, environments, and/or configurations that can be suitable for use with the systems and methods of the disclosure comprise personal computers, server computers, laptop devices or handheld devices, and multiprocessor systems. Additional examples comprise mobile devices, programmable consumer electronics, network PCs, minicomputers, mainframe computers, distributed computing environments that comprise any of the above systems or devices, and the like.

The processing effected in the disclosed systems and methods can be performed by software components. In one aspect, the disclosed systems and methods can be described in the general context of computer-executable instructions, such as program modules, being executed by one or more computers, such as computing device 301, or other computing devices. Generally, program modules comprise computer code, routines, programs, objects, components, data structures, etc. that perform particular tasks or implement particular abstract data types. The disclosed methods also can be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 301. The components of the computer 301 can comprise, but are not limited to, one or more processors 303, or processing units 303, a system memory 312, and a system bus 313 that couples various system components including the processor 303 to the system memory 312. In the case of multiple processing units 303, the system can utilize parallel computing.

In general, a processor 303 or a processing unit 303 refers to any computing processing unit or processing device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally or alternatively, a processor 303 or processing unit 303 can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors or processing units referred to herein can exploit nano-scale architectures such as, molecular and quantum-dot based transistors, switches and gates, in order to optimize space usage or enhance performance of the computing devices that can implement the various aspects of the subject disclosure. Processor 303 or processing unit 303 also can be implemented as a combination of computing processing units.

The system bus 313 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 313, and all buses specified in this specification and annexed drawings also can be implemented over a wired or wireless network connection and each of the subsystems, including the processor 303, a mass storage device 304, an operating system 305, tracking software 306, tracking data storage 307, a network adapter 308, system memory 312, an Input/Output Interface 310, a display adapter 309, a display device 311, and a human machine interface 302, can be contained within one or more remote computing devices 314a,b,c at physically separate locations, functionally coupled (e.g., communicatively coupled) through buses of this form, in effect implementing a fully distributed system.

Tracking software 306 can configure the computing device 301, or a processor thereof, to perform the weighing of moving objects in accordance with aspects of the disclosure. In scenarios in which computing device 301 embodies the analysis unit 130, tracking software 306 can configure such unit to perform the functionality described in the subject disclosure. Tracking software 306 can be retained in a memory as a group of computer-accessible instructions, e.g., computer-readable instructions, computer-executable instructions, or computer-readable computer-executable instructions. In one aspect, the group of computer-accessible instructions can encode the methods of the disclosure (such as the exemplary methods illustrated in FIGS. 4-6). In another aspect, the the group of computer-accessible instructions can encode various formalisms (e.g., image segmentation) for computer vision tracking Certain implementations of tracking software 306 can include a compiled instance of such computer-accessible instructions, a linked instance of such computer-accessible instructions, a compiled and linked instance of such computer-executable instructions, or an otherwise executable instance of the group of computer-accessible instructions. An implementation of tracking software 306 retained in a memory of the computing device 301 can embody tracking component 134, wherein in response to execution of the implementation of the tracking software 306 by the processor 301, for example, implements the described functionality of the tracking component 134 and, thereby, that of analysis unit 130.

Tracking data storage 307 can comprise various types of data that can permit implementation (e.g., compilation, linking, execution, and combinations thereof) of the tracking software 306. In one aspect, tracking data storage 307 can comprise tracking data described herein, such as images of a non-empty set of physical objects, and data structures containing information associated with weighing of an object. The information can comprise tracking information, trajectory information, or weight information. Tracking data storage 307 can embody tracking data storage 142.

The computing device 301 typically comprises a variety of computer readable media. Exemplary readable media can be any available media that is accessible by the computer 301 and comprises, for example and not meant to be limiting, both volatile and non-volatile media, removable and non-removable media. The system memory 312 comprises computer readable media in the form of volatile memory, such as random access memory (RAM), and/or non-volatile memory, such as read only memory (ROM). The system memory 312 typically contains data (such as a group of tokens employed for code buffers) and/or program modules such as operating system 305 and tracking software 306 that are immediately accessible to and/or are presently operated on by the processing unit 303. Operating system 305 can comprise OSs such as Windows operating system, Unix, Linux, Symbian, Android, iOS, Chromium, and substantially any operating system for wireless computing devices or tethered computing devices.

In another aspect, computing device 301 can comprise other removable/non-removable, volatile/non-volatile computer storage media. As illustrated, computing device 301 comprises a mass storage device 304 which can provide non-volatile storage of computer code (e.g., computer-executable instructions), computer-readable instructions, data structures, program modules, and other data for the computing device 301. For instance, a mass storage device 304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 304, including by way of example, an operating system 305, and tracking software 306. Each of the operating system 305 and tracking software 306 (or some combination thereof) can comprise elements of the programming and the tracking software 306. Data and code (e.g., computer-executable instruction(s)) can be retained as part of tracking software 306 and can be stored on the mass storage device 304. Tracking software 306, and related data and code, can be stored in any of one or more databases known in the art. Examples of such databases comprise, DB2®, Microsoft Access, Microsoft® SQL Server, Oracle®, mySQL, PostgreSQL, and the like. Further examples include membase databases and flat file databases. The databases can be centralized or distributed across multiple systems.

In another aspect, a user can enter commands and information into the computing device 301 via an input device (not shown). Examples of such input devices comprise, but are not limited to, a camera; a keyboard; a pointing device (e.g., a "mouse"); a microphone; a joystick; a scanner (e.g., barcode scanner); a reader device such as a radiofrequency identification (RFID) readers or magnetic stripe readers; gesture-based input devices such as tactile input devices (e.g., touch screens, gloves and other body coverings or wearable devices), speech recognition devices, or natural interfaces; and the like. These and other input devices can be connected to the processing unit 303 via a human machine interface 302 that is coupled to the system bus 313, but can be connected by other interface and bus structures, such as a parallel port, game port, an IEEE 1394 Port (also known as a Firewire port), a serial port, or a universal serial bus (USB).

In yet another aspect, a display device 311 also can be functionally coupled to the system bus 313 via an interface, such as a display adapter 309. It is contemplated that the computer 301 can have more than one display adapter 309 and the computer 301 can have more than one display device 311. For example, a display device can be a monitor, an LCD (Liquid Crystal Display), or a projector. In addition to the display device 311, other output peripheral devices can comprise components such as speakers (not shown) and a printer (not shown) which can be connected to the computer 301 via Input/Output Interface 310. Any step and/or result of the methods can be output in any form to an output device. Such output can be any form of visual representation, including, but not limited to, textual, graphical, animation, audio, tactile, and the like.

As illustrated, one or more camera(s) 318 can be functionally coupled to the system bus 313 through an I/O interface of the one or more I/O interface(s) 310. Through the functional coupling through such I/O interface, the one or more camera(s) can be functionally coupled to other functional elements of the computing device. In one embodiment, the I/O interface, at least a portion of the system bus 113, and system memory 312 can embody a frame grabber unit that can permit receiving imaging data acquired by at least one of the one or more camera(s) 318. Such frame grabber can be an analog frame grabber or a digital frame grabber, or a combination thereof. In case of an analog frame grabber, processor 303 can provide analog-to-digital functionality and decoder functionality, and the I/O interface can include circuitry to collect the analog signal received from at least one camera of the one or more camera(s) 318. In one aspect, in response to execution by processor 303, tracking software 306 can operate the frame grabber to receive imaging data in accordance with various aspects described herein. In one aspect, the one or more camera(s) 318 can embody the one or more camera(s) 120. In another aspect, the one or more camera(s) 318 can embody cameras $220_1$-$220_3$.

The computing device 301 can operate in a networked environment (e.g., an industrial environment) using logical connections to one or more remote computing devices 314a, b,c, and equipment 316. By way of example, a remote computing device can be a personal computer, portable computer, a mobile telephone, a server, a router, a network computer, a peer device or other common network node, and so on. Logical connections between the computer 301 and a remote computing device 314a,b,c can be made via a local area network (LAN) and a general wide area network (WAN). Such network connections can be implemented through a network adapter 308. A network adapter 308 can be implemented in both wired and wireless environments. Such networking environments can be conventional and commonplace in offices, enterprise-wide computer networks, intranets. The networking environments generally can be embodied in wireline networks or wireless networks (e.g., cellular networks, such as Third Generation (3G) and Fourth Generation (4G) cellular networks, facility-based networks (femtocell, picocell, Wi-Fi networks, etc.). A group of one or more network(s) 315 can provide such networking environments. In one scenario, the one or more network(s) can comprise a LAN deployed in an industrial environment comprising the exemplary system 100 described herein. In such scenario, the computing device 110 can embody analysis unit 130, remote computing devices 614a,b,c can embody cameras of the one or more camera(s) 120, and equipment 316 can comprise weighing platform 110.

As an illustration, application programs and other executable program components such as the operating system 305 are illustrated herein as discrete blocks, although it is recognized that such programs and components reside at various times in different storage components of the computing device 301, and are executed by the data processor(s) of the computer. An implementation of tracking software 306 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer-readable media can comprise "computer storage media," or "computer-readable storage media," and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 4:
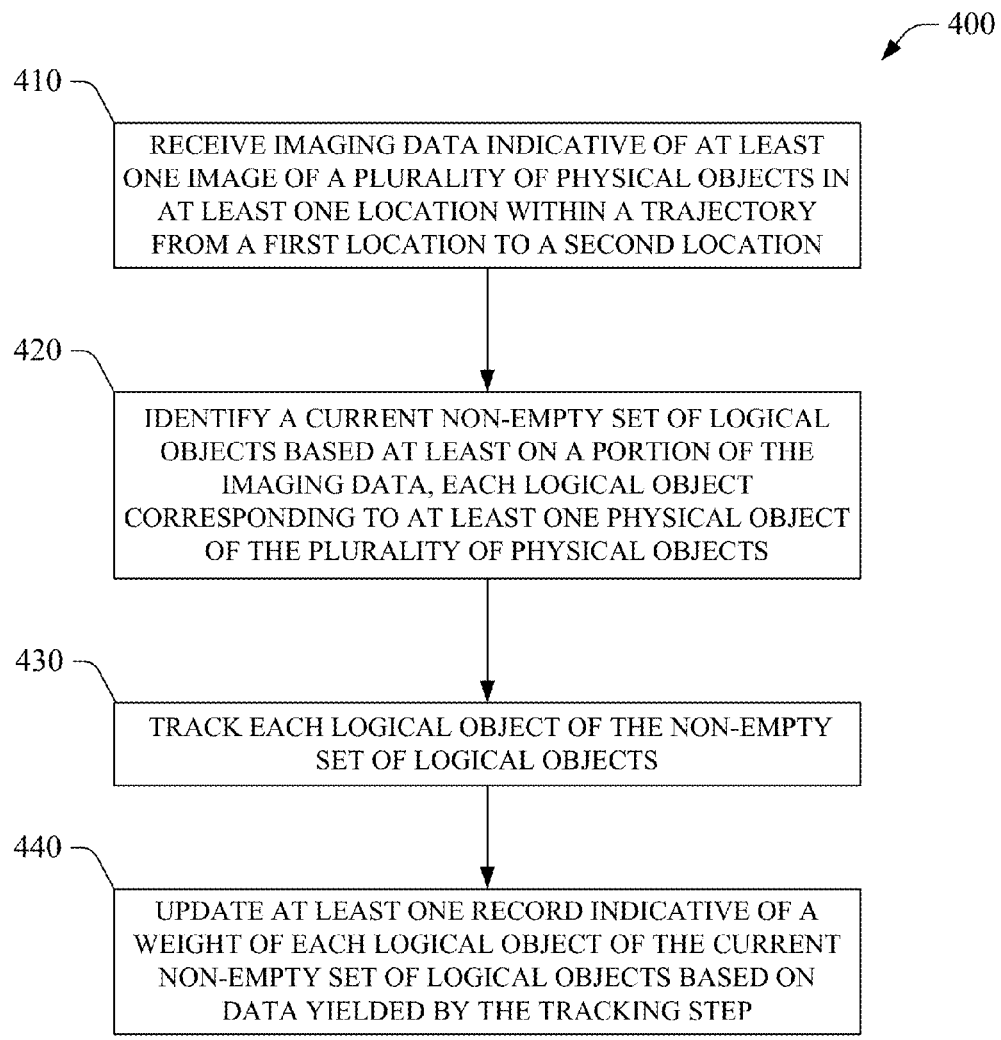
FIG. 4 illustrates an exemplary method for weighing objects moving from a first location to a second location according to one or more aspects of the disclosure.
Figure 5:
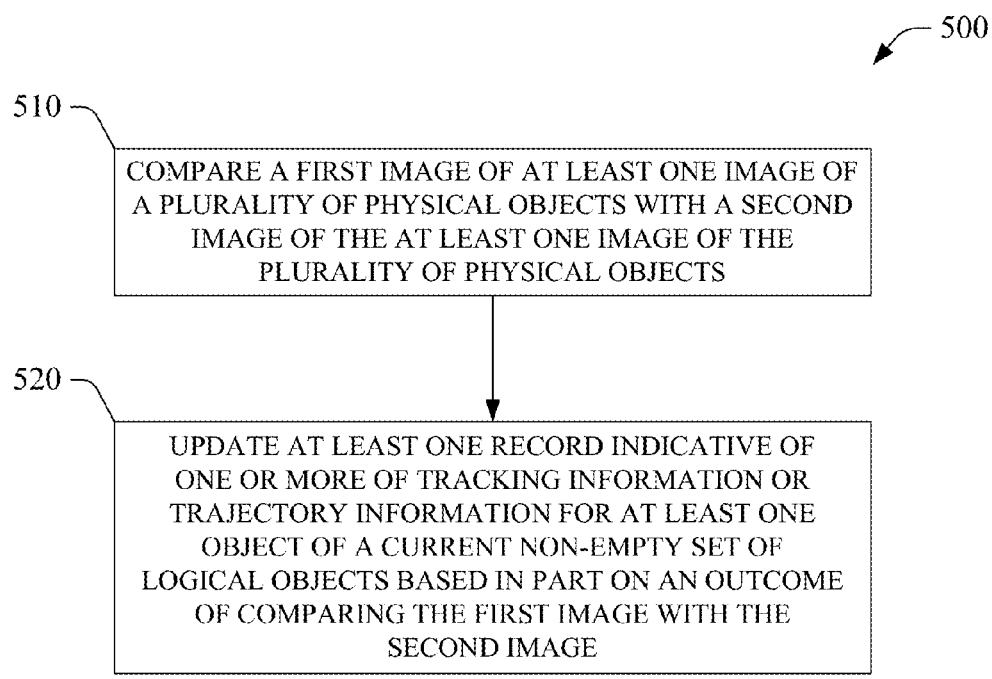
FIG. 5 illustrates an exemplary method for tracking a logical object in a group of one or more logical objects according to one or more aspects of the disclosure.
Figure 6:
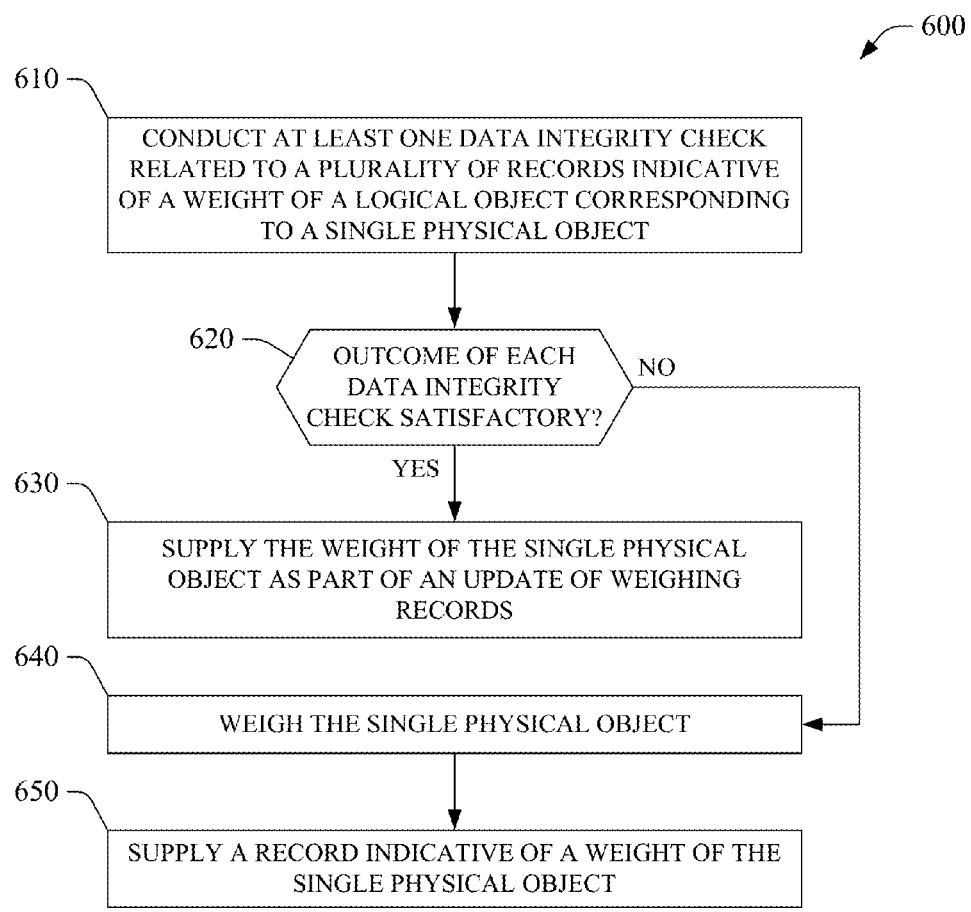
FIG. 6 illustrates an exemplary method for terminating a weighing of moving objects according to one or more aspects of the disclosure.

In view of the aspects described hereinbefore, an exemplary method that can be implemented in accordance with the disclosed subject matter can be better appreciated with reference to the flowcharts in FIGS. 4-6. For purposes of simplicity of explanation, the exemplary method disclosed herein is presented and described as a series of acts; however, it is to be understood and appreciated that the claimed subject matter is not limited by the order of acts, as some acts may occur in different orders and/or concurrently with other acts from that shown and described herein. For example, the various methods or processes of the subject disclosure can alternatively be represented as a series of interrelated states or events, such as in a state diagram. Furthermore, not all illustrated acts may be required to implement a method in accordance with the subject disclosure. Further yet, two or more of the disclosed methods or processes can be implemented in combination with each other, to accomplish one or more features or advantages herein described.

It should be further appreciated that the exemplary methods disclosed throughout the subject specification can be stored on an article of manufacture, or computer-readable medium, to facilitate transporting and transferring such methods to a computing device (e.g., a desktop computer, a mobile computer, a mobile telephone, a blade computer, a programmable logic controller, and the like) for execution, and thus implementation, by a processor of the computing device or for storage in a memory thereof FIG. 4 is a flowchart of an exemplary method 400 for weighing objects moving from a first location to a second location according to aspects of the disclosure. As described herein, the first location and the second locations are part of a region of a weighing platform spanning from an initial weighing area to a final weighing area. A computing device, such as analysis unit 130, can implement (e.g., execute) the subject exemplary method 400. At block 410, imaging data indicative of at least one image of a plurality of physical objects in at least one location within a trajectory from a first location to a second location is received. The imaging data can be received at the computing device that implements the subject exemplary method 400. At block 420, a current non-empty set of logical objects is identified based at least on a portion of the imaging data, each logical object corresponding to at least one physical object of the plurality of physical objects. In one aspect, identifying the current non-empty set of logical objects can comprise segmenting an image of the plurality of physical objects, wherein the image is conveyed by at least a portion of the data yielded by the imaging data.

At block 430, each logical object of the non-empty set of logical objects is tracked. In one aspect, block 430 can be referred to as a tracking step, which can be accomplished in various manners. For instance, FIG. 5 illustrates an exemplary method 500 for tracking a logical object in a non-empty set of logical objects. At block 510, a first image of at least one image of the plurality of physical objects with a second image of the at least one image of the plurality of physical objects is compared. In certain scenarios, the first image can be acquired at a first instant and the second image can be acquired at a second instant prior to the first instant. In other scenarios, the first image can be acquired at a first instant and the second image can be acquired at a second instant subsequent to the first instant. In one aspect, block 510 can be referred to as a comparing step. At block 520, at least one record indicative of one or more of (i) tracking information or (ii) trajectory information for at least one object of the current non-empty set of logical objects is updated based in part on an outcome of comparing the first image with the second image (or the comparing step). To at least such end, in one aspect, when the outcome of the comparing step is indicative of a logical object of the at least one logical object being new in the current non-empty set of logical objects, updating the at least one record indicative of one or more of the tracking information or the trajectory information can comprise retaining data indicative of an identifying feature (shape, color, grey hue, etc.) of the logical object, and retaining data indicative of a current location of the logical object in a trajectory from the initial weighing area to the final weighing area. In the alternative, in another aspect, when the outcome of the comparing step is indicative of an object of the at least one object being extant in the current non-empty set of logical objects from a prior non-empty set of logical objects, updating the at least one record representative of one or more of (i) the tracking information or (ii) the trajectory information can comprise retaining data indicative of a current location of the object in a trajectory from the initial weighing area to the final weighing area. In yet another aspect, updating the at least one record indicative of the weight of each logical object of the current non-empty set of logical objects based on data yielded by a tracking step (e.g., block 430) can comprise determining if the logical object composed a previous logical object of a previous non-empty set of logical objects and, in response to an outcome of such determination being indicative of the logical object having composed the previous logical object, invalidating a previous record indicative of a weight of the previous logical object. Discarding such a record can increase data integrity or fidelity of weight records of a physical object associated with a logical object.

At block 440 of exemplary method 400, at least one record indicative of a weight of each logical object of the current non-empty set of logical objects is updated based on data yielded by the tracking step.

In implementations in which a weighing termination criterion (e.g., the second location is within the final weighing area) is unfulfilled, exemplary method 400 can include reiterating blocks 410 through 440. In the alternative, when the weighing termination criterion (e.g., the second location is within the final weighing area) is satisfied, for example, as a result of iterative implementation (e.g., execution) of blocks 410-440, a termination procedure can be performed. As an illustration, FIG. 6 is a flowchart of an exemplary method 600 for terminating the weighing of moving objects, such as the objects moving from the first location to the second location, according to aspects of the disclosure. At block 610, at least one data integrity check related to the plurality of records indicative of a weight of a logical object corresponding to a single physical object is conducted (e.g., executed). Block 610 can be referred to as the conducting step. In one aspect, the conducting step can comprise ascertaining that at least one record of the plurality of such records is non-null. In another aspect, the conducting step can comprise ascertaining that the plurality of such records presents fluctuations within a specific first tolerance. In yet another aspect, the conducting step can comprise ascertaining that a plurality of records indicative of at least one identifying feature (shape, color, grey hue, etc.) of the single physical object presents fluctuations within a specific second tolerance, wherein each record of the plurality of records corresponds to a location in a trajectory from the initial weighing area to the final weighing area.

At block 620, it is determined if outcome of each data integrity check of the at least one data integrity check is satisfactory. In response to a satisfactory outcome for each of such checks, the weight of the single physical object is supplied as part of an update of weighing records. In the alternative, in response to an unsatisfactory outcome for one or more of the at least one data integrity check, the single physical object can be weighed (e.g., by a scale) at block 640. Such weighing can be performed at the final weighing area. In addition, a record indicative of a weight of the single physical object, as yielded by the weighing step, can be supplied (e.g., by the scale) at block 650.

In various embodiments, the systems and methods of the subject disclosure for weighing an object through, at least in part, computer-vision tracking can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the systems, devices, apparatuses, protocols, processes, and methods have been described in connection with exemplary embodiments and specific illustrations, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where description of a process or method does not actually recite an order to be followed by its acts or steps or it is not otherwise specifically recited in the claims or descriptions of the subject disclosure that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent to those skilled in the art that various modifications and variations can be made in the subject disclosure without departing from the scope or spirit of the subject disclosure. Other embodiments of the subject disclosure will be apparent to those skilled in the art from consideration of the specification and practice of the subject disclosure as disclosed herein. It is intended that the specification and examples be considered as non-limiting illustrations only, with a true scope and spirit of the subject disclosure being indicated by the following claims.

What is claimed is:

1. An apparatus that weighs objects moving along a trajectory from a first location to a second location, the first location and the second location being part of a region spanning from an initial weighing area to a final weighing area, the apparatus comprising:
   a memory comprising computer-executable instructions; and
   a processor functionally coupled to the memory and configured, by the computer-executable instructions, to
      receive weighing data from the first location indicative of a weight of at least one physical object of a plurality of physical objects;
      receive imaging data from a first imaging location indicative of at least one image of the plurality of physical objects at one or more imaging locations within the trajectory from the first location to the second location;
      identify a current non-empty set of logical objects based on the imaging data from the first imaging location, at least one logical object corresponding to the at least one physical object of the plurality of physical objects,
      track the at least one logical object of the non-empty set of logical objects using the imaging data from the first imaging location compared with a second imaging data acquired at a second imaging location of the one or more imaging locations and, as a result, yield tracking data, and
      update at least one record indicative of a weight of the at least one logical object of the current non-empty set of logical objects based on the weighing data of the at least one physical object at the first location and the tracking data of the at least one logical object.

2. The apparatus of claim 1, when the second location is within the final weighing area, the processor is further configured to
   implement at least one data integrity check related to a plurality of records indicative of a weight of a logical object corresponding to a single physical object and, in response to a satisfactory outcome for each data integrity check of the at least one integrity check,
   supply the weight of the single physical object.

3. The apparatus of claim 2, in response to an unsatisfactory outcome for one or more of the at least one data integrity check, the processor is further configured to probe a weight of the single physical object at the final weighing area, and supply a record indicative of the weight of the single physical object.

4. The apparatus of claim 3, wherein to implement the at least one data integrity check, the processor is configured to determine if at least one record of the plurality of records indicative of the weight of the single physical object is non-null.

5. The apparatus of claim 3, wherein to implement the at least one data integrity check, the processor is configured to determine if the plurality of records indicative of the weight of the single physical object presents fluctuations within a predetermined first tolerance.

6. The apparatus of claim 3, wherein to implement the at least one data integrity check, the processor is configured to determine if a plurality of records indicative of at least one identifying feature of the single physical object presents fluctuations within a predetermined second tolerance, wherein each record of the plurality of records corresponds to a location in a trajectory from the initial weighing area to the final weighing area.

7. The apparatus of claim 1, wherein to track each logical object of the non-empty set of logical objects, the processor is configured to
   compare a first image of the at least one image of the plurality of physical objects with a second image of the at least one image of the plurality of physical objects, the first image acquired at a first instant and the second image acquired at a second instant subsequent to the first instant; and
   update at least one record representative of one or more of tracking information or trajectory information for at least one logical object of the current non-empty set of logical objects based on an outcome of comparison of the first image with the second image.

8. The apparatus of claim 7, when the outcome of the comparison of the first image with the second image is indicative of a logical object of the at least one logical object being new in the current non-empty set of logical objects, the computing device is further configured to
   retain data indicative of an identifying feature of the logical object; and
   retain data indicative of a current location of the logical object in a trajectory from the initial weighing area to the final weighing area.

9. The apparatus of claim 7, when the outcome of the comparison of the first image with the second image is indicative of a logical object of the at least one logical object being extant in the current non-empty set of logical objects from a prior non-empty set of logical objects, the computing device is further configured to
   retain data indicative of a current location of the logical object in a trajectory from the initial weighing area to the final weighing area.

10. The apparatus of claim 1, wherein to identify a current non-empty set of logical objects based on the imaging data, the computing device is configured to segment an image of the at least one image of the plurality of physical objects.

11. A method for weighing objects moving along a trajectory from a first location to a second location, the first location and the second locations being part of a region spanning from an initial weighing area to a final weighing area, the method comprising the steps of:
   (i) receiving, at a computer, weighing data from the first location indicative of at least one physical object of a plurality of physical objects, and receiving imaging data from a first imaging location indicative of at least one image of the plurality of physical objects in at least one imaging location within the trajectory from the first location to the second location;
   (ii) identifying, by the computer, a current non-empty set of logical objects based at least on a portion of the imaging data from the first imaging location, at least one logical object corresponding to at least one physical object of the plurality of physical objects;
   (iii) tracking, by the computer, the at least one logical object of the non-empty set of logical objects using the imaging data from the first imaging location compared with a second imaging data acquired at a second imaging location of the at least one imaging location; and
   (iv) updating, by the computer, at least one record indicative of a weight of the at least one logical object of the current non-empty set of logical objects based on weighing data of the at least one physical object at a weighing location along the trajectory and tracking data yielded by the tracking step.

12. The method of claim 11, further comprising reiterating steps (i) through (iv) at least once.

13. The method of claim 12, when the second location is within the final weighing area, further comprising:
- conducting, by the computer, at least one data integrity check related to a plurality of records indicative of a weight of a logical object corresponding to a single physical object, and
- in response to a satisfactory outcome for each data integrity check of the at least one integrity check, the updating step comprises supplying the weight of the single physical object.

14. The method of claim 13, further comprising, in response to an unsatisfactory outcome for one or more of the at least one data integrity check,
- weighing, by a scale, the single physical object at the final weighing area, and
- supplying, by the scale, a record indicative of a weight of the single physical object yielded by the weighing step.

15. The method of claim 13, wherein the conducting step comprises ascertaining that at least one record of the plurality of records indicative of the weight of the single physical object is non-null.

16. The method of claim 13, wherein the conducting step comprises ascertaining that the plurality of records indicative of the weight of the single physical object presents fluctuations within a specific first tolerance.

17. The method of claim 13, wherein the conducting step comprises ascertaining that a plurality of records indicative of at least one identifying feature of the single physical object presents fluctuations within a specific second tolerance, wherein each record of the plurality of records corresponds to a location in a trajectory from the initial weighing area to the final weighing area.

18. The method of claim 11, wherein the tracking step further comprises:
- comparing a first image of the at least one image of the plurality of physical objects with a second image of the at least one image of the plurality of physical objects, the first image acquired at a first instant and the second image acquired at a second instant subsequent to the first instant; and
- updating at least one record representative of one or more of tracking information or trajectory information for at least one object of the current non-empty set of logical objects based on an outcome of the comparing step.

19. The method of claim 18, when the outcome of the comparing step is indicative of a logical object of the at least one logical object being new in the current non-empty set of logical object, updating the at least one record representative of one or more of the tracking information or the trajectory information comprises:
- retaining data indicative of an identifying feature of the logical object; and
- retaining data indicative of a current location of the logical object in a trajectory from the initial weighing area to the final weighing area.

20. The method of claim 19, wherein updating, by the computer, the at least one record indicative of the weight of each logical object of the current non-empty set of logical objects based on data yielded by the tracking step comprises:
- determining if the logical object is composed of a previous logical object of a previous non-empty set of logical objects and, in response to an outcome of the determining step indicative of the logical object composed of the previous logical object, invalidating a previous record indicative of a weight of the previous logical object.

21. The method of claim 18, when the outcome of the comparing step is indicative of an object of the at least one object being extant in the current non-empty set of logical objects from a prior non-empty set of logical objects, updating the at least one record representative of one or more of the tracking information or the trajectory information comprises:
- retaining data indicative of a current location of the object in a trajectory from the initial weighing area to the final weighing area.

22. The method of claim 11, wherein the identifying step comprises segmenting an image of the plurality of physical objects, the image conveyed by at least a portion of the imaging data.

23. A system comprising:
- a movable platform that transports a plurality of objects from a first location to a second location, wherein the first location and the second location are part of a trajectory from an initial weighing area to a final weighing area;
- a plurality of scales that weigh at least one physical object of the plurality of objects and supplies weighing data from the first location indicative of a weight of the at least one physical object to a computing device, wherein the plurality of scales are functionally coupled to the movable platform; and
- a camera that acquires at least one image of the plurality of physical objects at one or more imaging locations within a trajectory from the first location to the second location, and yields imaging data from a first imaging location indicative of the at least one image; and
- an analysis unit configured to:
  - identify a non-empty set of logical objects based on the imaging data from the first imaging location, at least one logical object corresponding to one or more physical objects of the plurality of physical objects,
  - track the at least one logical object of the non-empty set of logical objects using the imaging data from the first imaging location compared with a second imaging data acquired at a second imaging location of the one or more imaging locations and, as a result, yield tracking data, and
  - update at least one record indicative of a weight of the at least one logical object of the non-empty set of logical objects based on the weighing data of the at least one physical object at the first location and the tracking data of the at least one logical object.

* * * * *